INVENTOR.
OLE-BENDT RASMUSSEN

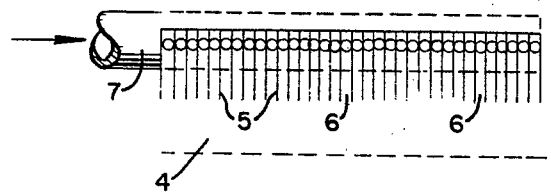
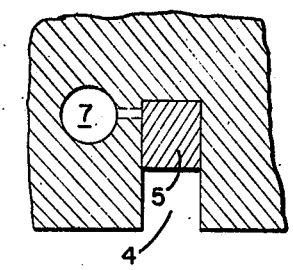
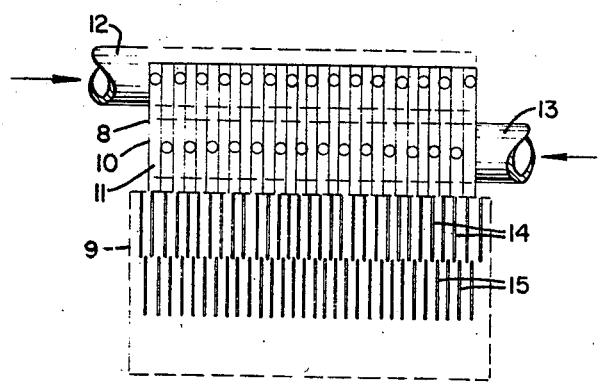
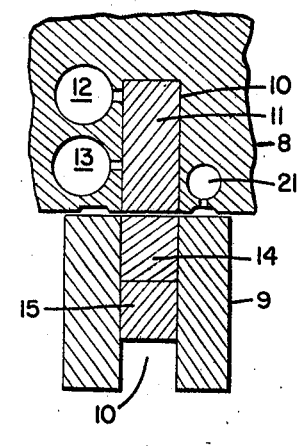
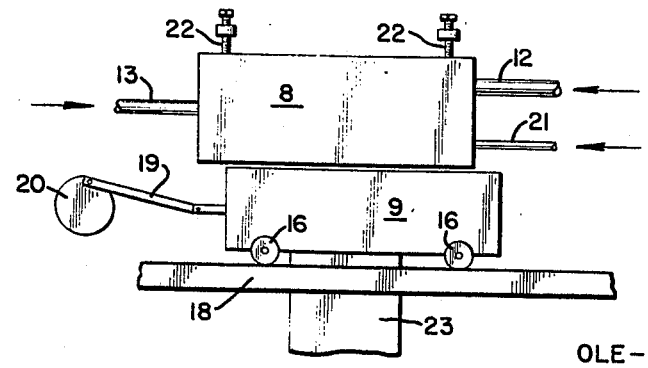
INVENTOR
OLE-BENDT RASMUSSEN

FIG. 9
FIG. 10
FIG. 11
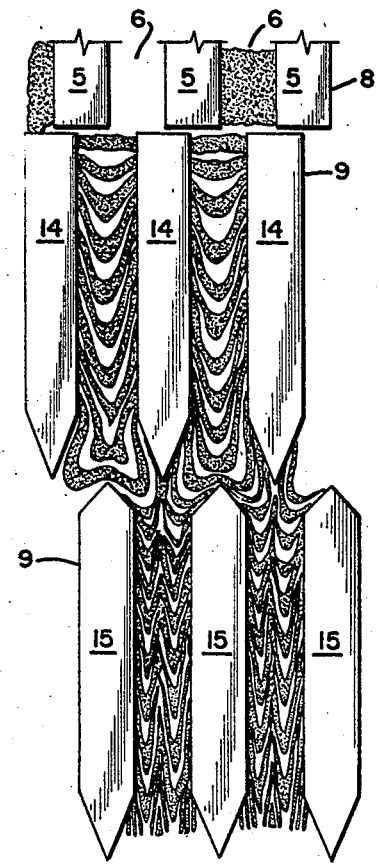
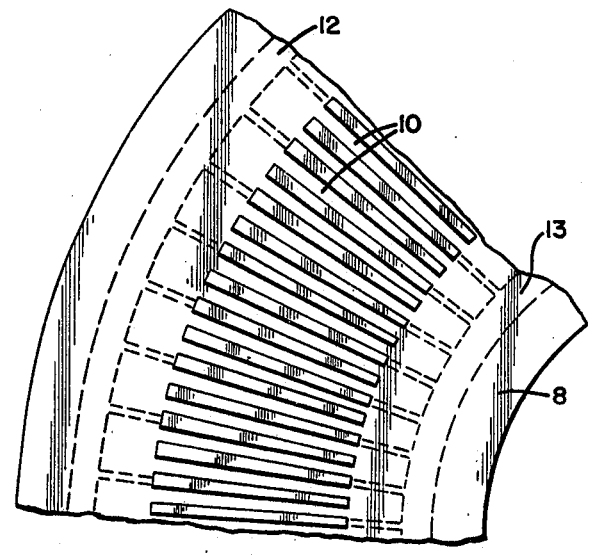
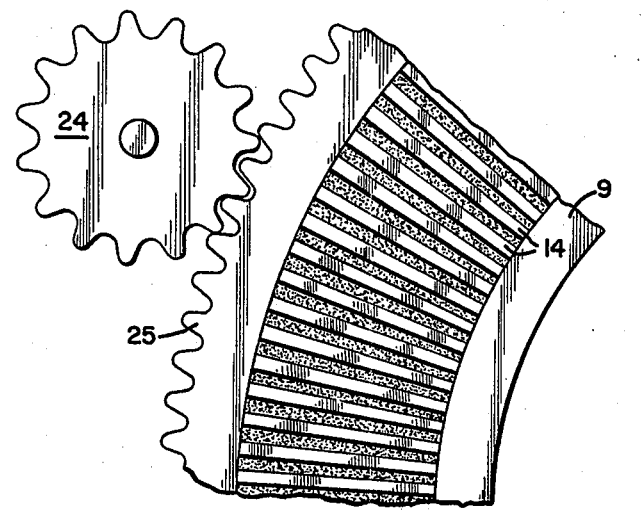
*INVENTOR.*
OLE-BENDT RASMUSSEN

INVENTOR.
OLE-BENDT RASMUSSEN

May 12, 1970   OLE-BENDT RASMUSSEN   3,511,742
FORAMINOUS PLASTIC SHEET MADE BY SUCCESSIVE TRANSVERSE
SHEARING OF EXTRUDING POLYMER STREAM WITH METHOD
AND APPARATUS FOR MAKING SAME
Filed Aug. 25, 1964   5 Sheets-Sheet 5
FIG. 16
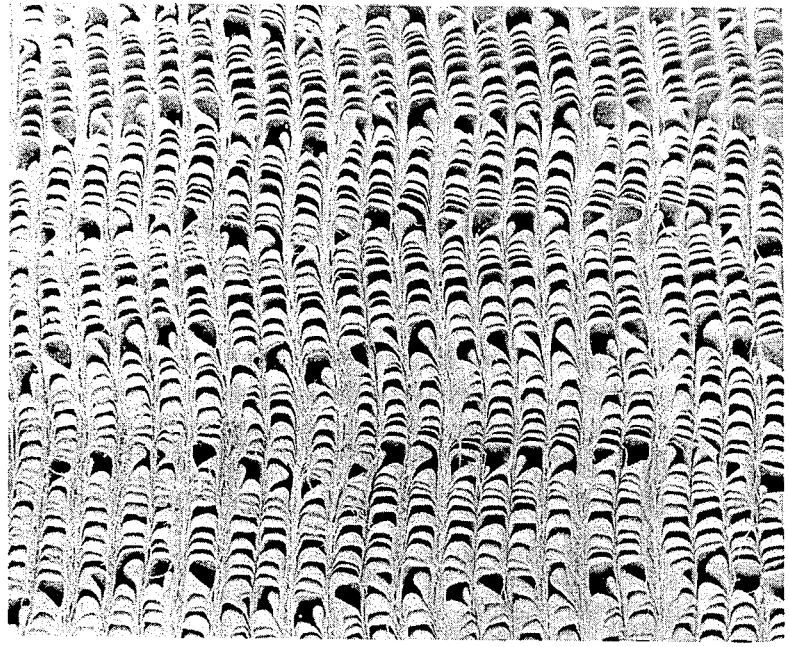
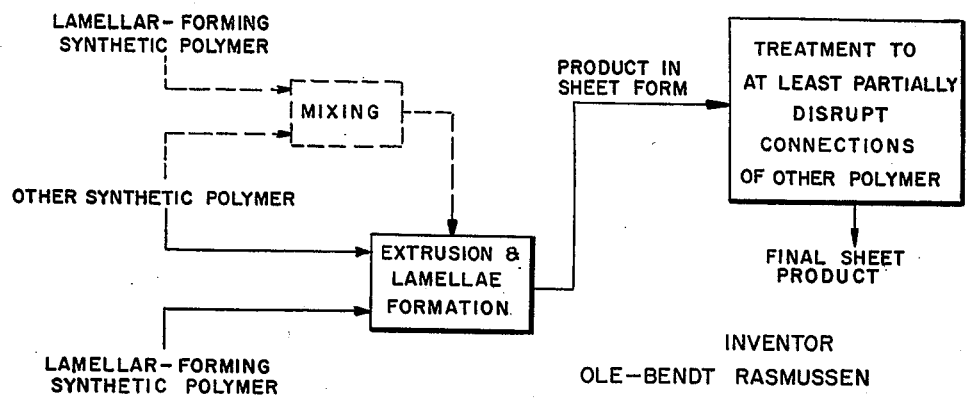
FIG. 15
INVENTOR
OLE-BENDT RASMUSSEN

United States Patent Office

3,511,742
Patented May 12, 1970

3,511,742
FORAMINOUS PLASTIC SHEET MADE BY
SUCCESSIVE TRANSVERSE SHEARING OF
EXTRUDING POLYMER STREAM WITH
METHOD AND APPARATUS FOR MAKING
SAME
Ole-Bendt Rasmussen, 14 Gyvelbakken,
Birkerod, Denmark
Filed Aug. 25, 1964, Ser. No. 391,997
Claims priority, application Great Britain, Aug. 28, 1963,
33,978/63; Apr. 16, 1964, 15,752/64
Int. Cl. B32b 3/10; B29f 3/01
U.S. Cl. 161—109                                21 Claims

ABSTRACT OF THE DISCLOSURE

Thermoplastic sheet material for textile use is produced from at least two polymers of differing properties forming separate phases, at least one of the components being in the form of very thin lamelae situated in planes forming an angle to the sheet plane. A treatment is applied to make one of the phases more susceptible to treatment than is the other for the production of splits in one of the lamellar phases by means of a selective chemical attack such as by a swelling agent.

---

Figure 1:
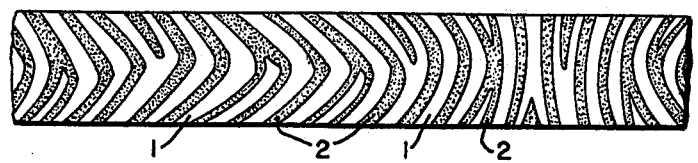

This invention relates to a sheet material, composed from two or several thermoplastic polymers, to a method of producing said sheet material and to a method of producing articles for textile use therefrom.

The term splitfibres is commonly used for fibres or fibrous or porous materials manufactured by splitting up oriented thermoplastic films. Most polymers which have been strongly oriented, are easily split mechanically in the direction of orientation in many different ways to form either stable fibres or a branched network of interconnected fibres. The latter can then either be cut to narrow strips which are used as yarns, or they can be laminated with other networks of the same kind to form a non-woven fabric.

It is known that the existence of two different phases in an oriented film of the said kind facilitates the splitting into fibres. Thus an oriented and heat-treated film consisting of poly-caprolactam will be found to have a microstructure of fibrillar character in two phases, fibrils of high crystallinity lying adjacent to, and alternating with fibrils of less crystallinity. The usual types of said polymer cannot normally be oriented at a draw ratio higher than about 5:1 before bursting, and by such relatively slight orientation, they are not sufficiently fissile to easily being split into fibres. It has been suggested, however, to loosen the microstructure before splitting by treating the film with a swelling agent which has been selected so as to act mainly upon the less crystalline fibrils, leaving the highly crystalline fibrils intact. By this method the splitting process can be carried out readily.

According to another suggestion, two different polymers are mixed and made into a film for splitfibre production, one polymer being hydrophobic and the other one hydrophilic, the former being the major ingredient of the mixture, and the mixture being relatively heterogenous. After orientation, when both phases have a more or less fibrillar shape, an agent is used which swells the hydrophilic fibrils, but not the hydrophobic ones, and by the subsequent splitting, the splits will therefore tend to occur in the hydrophilic phase. The resulting splitfibres hereby obtain a hydrophilic surface on a hydrophobic core, making them useful for many textile purposes.

In both the aforementioned methods, the formation or mixing of the two phases take place at random, and the fibrils in the oriented film consequently have a randomly shaped cross-section.

Finally, processes of incorporating a separate phase have been used as means for facilitating the splitting up. Thus grains of slipping agents have been introduced to act as starting points for the formation of splits, and grains of explosives or other substances which on suitable treatment evolve gases or vapours, have been incorporated in order to assist in the splitting by creating an interior pressure. Also, in these cases, however, the incorporation has taken place more or less at random.

The main object of the present invention is to provide a sheet material in which two thermoplastic polymer substances are intermixed to form a structure of a special pattern, instead of being mixed at random, the aim of this structure being to facilitate the splitting into fibres and thereby to improve the fineness of the fibres.

The thermoplastic sheet material of the present invention accordingly comprises at least two polymers of differing properties forming separate phases, at least one of the components being in the form of very thin lamellae situated in planes forming an angle to the sheet plane, the material adjacent to the lamellae consisting of the other one of said polymers. These lamellae are arranged in closely stacked relationship with the corresponding portions of their faces oriented in the same direction at an angle to the sheet plane or surface.

For the sake of simplicity the following description deals only with sheet materials comprising two phases, but it should be understood that the considerations also apply to sheets of three or more different phases.

The use of the present invention in the production of fibres is based upon the fact that a treatment always exists for making one of the components in a thermoplastic material consisting of two phases more susceptible to attacks than the other, when the two phases consist of polymer substances mutually differing in one way or another, as in basic chemical conceptions, substances are not considered as different if they cannot be separated by selected treatments. With regard to the sheet according to the present invention it will thus be possible to develop a predominant tendency for forming spilts in one of the lamellary phases, and splitting can then be carried out mechanically. For this purpose the lamellary structure has proved far more effective than the fibrillar structure which is formed by a mixing at random of the components. To carry out a selective attack upon one of the phases, the process of treating the composite sheet with a selected swelling agent is especially useful, but other treatments may be used alternatively, e.g. partial melting, or a selective chemical attack by means of an active substance, or even irradiation, when the susceptibility of the two phases is different as regards these treatments.

In a preferred embodiment of the thermoplastic sheet material of the present invention, the two phases consist of the same polymer, but with mutually different average molecular weight, one phase containing a larger proportion of low molecular substance than the other.

Using the same kind of polymer for the two phases ensures excellent cohesion between the phases, and a surplus of low molecular substance in one of the phases decreases the strength of this phase, making it more easily splittable.

Other manners of increasing the fissility of one of the phases are, for example, incorporation of a common slipping agent, such as silicone or a stearate, or of oil droplets, the oil being absorbed in the polymer during the extrusion and separated by cooling of the extruded product.

The special advantage of the said embodiments is the simplicity in production, as no process of development is needed. If, however, the sheet material of the invention is intended for the production of articles which in use may be exposed to strong abrasion, the said embodiments are not recommendable. In that case, other embodiments of the present invention are preferred, offering the important advantages that the fissility can be eliminated or essentially diminished after the splitting process has been carried through, which results in a fibrous article of good abrasive resistance.

This is attained if the degree of orientation of the molecules is far from the ultimate, and the connection between the phases is strong, and if the development of the fissility is a reversible process, i.e. the attacked phases becoming strong again when the process, as for example swelling or partial melting, is stopped. The following two embodiments of the present invention have for their special objects the establishment of a strong cohesion between the lamellary phases.

Before these embodiments are explained it should be noticed that in the prior art no procedure is known for making a polymer substance apt for splitting by development of a latent fissility and then, when resistance is subsequently wanted, making the fissility latent again. As mentioned hereinbefore, the prior art comprises the method of treating films of polyamide and other polymers with a swelling agent in order to develop fissility, but as the said oriented films always form a microstructure composed of microfibrils with cross-sections shaped at random, the effect is different. When the known technique is used, interior displacements take place during the splitting process, even when no real splitting occurs, and consequently the material is still rather fissile when the swelling agent is removed. According to the present invention, when the phases are shaped as lamellae, the tensions are more evenly distributed in the sheet, and the accidental displacements are hereby diminished.

To the end of establishing a good cohesion between the phases, one embodiment of the present invention is characterised in that the phases consist of different crystalline polymers being able to unite by crystallization, as by forming mixed crystallites. The mixed crystallization of the selected polymers in the interphases usually occurs spontaneously on cooling after extrusion, but subsequent annealing may be useful. In some cases, the mixed crystallization can even be carried out at a stage when the sheet has been transformed into a fibrous material. Thus, according to the invention, the phases can, for instance, consist of two different polyamides, or both may consist of polyalkylenes, one being, however, made from a very linear or isotactic type of the polymer in question, and the other one from a branched type or a type with relatively high atactic contents. As a further example, according to the invention, one phase can consist of a crystalline homopolymer, and the other of mainly the same polymer, however, modified by copolymerisation in order to increase its susceptibility to a swelling treatment. The copolymer in question may with advantage be formed as a graft- or a block-polymer.

Still to the end of establishing a good cohesion between the phases, another embodiment is characterised in that the phases differ only in one of them containing an admixture of a different polymer of greater susceptibility to a dissolving treatment. When crystallization has taken place the crystallites of the polymer, which is shared by the two phases, form a strong connection between the lamellae. The addition of another polymer to the crystalline one primarily has the function of modifying its susceptibility to solvents, either towards a higher susceptibility to polar solvents, or towards a higher susceptibility to nonpolar solvents. Another function is to increase the flexibility, which also is of importance for the abrasion resistance of the split material.

One phase may, for instance, consist of a combination, intensively mixed, of a crystalline polymer which has very low susceptibility to a polar organic solvent, as e.g. polyethylene, propylene, and an elastomer with high susceptibility to the said kind of solvents, e.g. polymethyl, polyethyl or polypropyl acrylate or polyvinyl acetate or propionate. The other phase can then consist either of the said crystalline polymer or a mixture of the latter with an elastomer which also has low susceptibility to polar organic solvents, e.g. polyisobutylene. In order to facilitate the blending of the substances for each of the phases, graft- or block-polymers can be added.

A combination of the two last mentioned embodiments consists in using for the connection of the two phases of which one is a mixture, two different crystalline polymers, which are able to form mixed crystallites together, as hereinbefore mentioned.

One of the said crystalline polymers may, for instance, be a graft- or block-polymer, of which one of the constituents corresponds to the other crystalline polymer, but, contrary to the above-mentioned example of using graft- or block-polymers as the only or main part of one of the phases, the said polymer is here an admixed small proportion of an elastomer, which is intended to serve for the separation of the phases. In this connection it should be mentioned that the surface activity of graft- or block-polymers is also useful for the formation of well-shaped lamellae in the extruder head.

The invention further comprises a method of producing the present thermoplastic sheet material, in which at least two thermoplastic polymers of differing properties, and being in the fluid state, each of them being divided in a multitude of streams, are joined with one another in an extruding device in such a manner that each individual stream of one polymer has for its neighbors individual streams of the other polymer(s) in a sheet-like structure extruded from the said device, said structure being forced through and subjected to the shearing action of a grid-like device moving in lateral direction to the direction of movement of the sheet to draw out the material of said individual streams laterally prior to solidification of the sheet.

As stated hereinbefore, the thermoplastic sheet material of the invention is particularly suited for use in the production of fibrous products for textile use, and the invention also comprises methods and means for producing such products, as will be more explicitly explained in the following.

A variety of ways are known in the art for splitting up or fibrillating films which have been given a strong molecular orientation usually by strong stretching. Due to their lamellary structure, the products of this invention have the same ability to undergo splitting up or fibrillation and, consequently, any of the techniques known to be useful for strongly oriented structures can be adopted here. These methods typically include one or more of the steps e.g. of brushing, twisting or rubbing of narrow bands of the material, of treatment with ultrasonic vibrations, or of stretching in the direction of minor strength when the material is sandwiched under a high pressure between two rubber belts.

The term "disrupt" is used in the claims to broadly cover the splitting up of the extruded sheets of this invention by any of the procedures suitable for that purpose. The term "at least partially disrupt" is intended to indicate that the splits may not necessarily extend entirely through the thickness of the sheet.

Before the main splitting process is carried out, it is recommendable to make a fine splitting near the surfaces of the sheet only, leaving the interior intact. Accorrding to the present invention, this is carried out immediately after the contacting with a swelling agent, before the latter has penetrated to the interior, and may take place by brushing, rubbing or scratching of the surface by means of a brush or a blade. The sheet is hereby well prepared for forming the final deep splits with close spacing, but the swelling agent has to penetrate to the interior parts before the main splitting process is carried out. The article with splits at one or both surfaces, but not through the interior part, is, however, directly useful for purposes where penetrating porosity is not necessary, but textile-like appearance is wanted.

In the introduction, it is mentioned that a method exists for splitting up oriented films by development of an internal pressure. To this end, the film is supplied by incorporation with materials which can be brought to evolve gas or vapour, or substances which can assist in creating an osmotic pressure by means of penetrating swelling agents. The sheet material of the present invention can be used also in connection with this general type of splitting-up processes. In order to create an expansion, the incorporated material is then localized to one of the lamellary phases, the other phase being left substantially intact, when the process of expansion is carried out. This allows for more freedom in the choice of means for the expansion, because it is not necessary to strictly prevent the thermoplastic substances from losing their orientation. Although orientation is generally recommendable, it is, as already mentioned, not a strict necessity for carrying out the splitting up of the sheet material according to the invention.

A simple example of applying the method of splitting by internal pressure in the present invention is to use a volatile swelling agent for expansion of one of the phases of the sheet. Another example is to incorporate a substance of osmotic activity when producing the sheet material, i.e. a substance which is well soluble in the swelling agent to be used. When such a substance is incorporated in the phase which is subjected to swelling, the said phase can be disintegrated by osmosis, but it is generally recommendable to apply splitting by internal pressure with caution, and only as a start for a subsequent mechanical splitting process, as it is usually important to maintain a good coherence in the split material. For the sake of completeness it should be noted that actually the two phases in the sheet may be made from exactly identical substances with exception of the means for osmosis, which are only dispersed in one of the phases. As a further example calcium carbonate or a similar gas evolving substance may be incorporated in one of the phases, the swelling being carried out by means of an acid, in order to produce an evolution of gas.

It is usually not recommendable to carry out a splitting deep enough for separating substantially all parts of phases. It is, however, generally preferable to make the splits close enough for producing the fibres in the shape of lamellae. This structure is especially advantageous in the manufacture of non-woven fabrics, because the lamellae, which stands as a kind of pile, gives the fabric improved hand and appearance.

The said kind of fabric has been further improved, a novel three-dimensional structure of improved flexibility and of larger surface being obtained, consisting of lamellary or platelike polymer segments, mutually connected substantially through fibres. From each of the flat surfaces of the said lamellae or flakes a multitude of said fibres extend from points which are relatively closely spaced and are distributed all over the said surface in both dimensions of the latter. The said fibres form bridge-like connections between adjacent lamellae or flakes.

This new article can be produced by splitting off parts of the abovementioned sheet material consisting of two lamellary or flakelike phases formed by compatible polymer substances, when the said sheet is oriented in a direction crossing the interphases, and when the different phases are of different ability to become oriented or split. The splitting, by which fibres are formed, will then take place only in one of the phases, i.e. in every second of the lamellae, and will develop transversally through the said lamellae. However, it is preferable that the angle between the interphases and the direction of orientation be relatively low as this facilitates orientation as well as splitting.

An angle between the direction of orientation and the interphases can for instance be obtained when the sheet is produced in tubular shape with substantially longitudinal lamellae, and is cut spirally to a band in known manner, said band being subsequently stretched in the longitudinal direction in order to make one of the phases split into fibres.

The word fibres is here used to indicate that the said structural elements are, even in the biggest dimension of their cross-section, much smaller than the smallest dimension of the surfaces which they connect. The said fibres are, however, often flat structures themselves.

The phase to remain unsplit preferably consists of a polymer substance being tougher than the substance in the other phase but having the ability to unite well with the latter. In order to acquire sufficient toughness the former can be produced from a substance of generally the same composition as the latter but having a substantially higher crack resistance, as obtained for instance by copolymerisation or by blending with a compatible elastomer, or by other well-known methods. The phase to become fiberized can, on the other hand, with advantage be supplied with contents of a substance which decreases the crack resistance, such as a slipping agent or a low-molecular weight modification of the polymer of the crack resistant phase.

The splitting can be carried out by well-known methods, such as hammering, or bending over sharp edges, or rubbing on the surfaces, or stretching in a direction which crosses the direction of orientation. Usually the phase, which remains unsplit, will become more or less elongated or thickened at the same time as the other phase splits to fibres.

In some cases, the orientation and splitting can take place simultaneously and by means of drawing alone, especially when the fissile phase is supplied with relatively coarse grains of a slipping agent and when further the orientation is carried out at a relatively low temperature.

An article as hereinbefore described, consisting of lamellary or platelike polymers interconnected by fibres of another polymer could also be produced from a sheet material according to the invention, in which the lamellae of the polymer, which are not attacked in the fiberizing process, are more distantly spaced, the intervening spaces consisting of the polymer or polymers to be fiberized. In this manner, the bulk of the resulting article would be increased, since the interconnecting fibres obviously will be of substantially smaller cross-section than that of the lamellae.

It should be understood too, that in producing the sheet material of this invention, the viscosity of the polymers to be used plays a certain role in the formation of the lamellary structure. Thus, if substantially equal proportions of the polymers are used for manufacturing the sheet material, the best results are obtained if the viscosity of the polymers is about the same. If, on the other hand, the proportion of one polymer is greater than that of the other(s), the viscosity of the former should be lower than that of the other(s) in order to get a good lamellary structure in the method of manufacture hereinbefore described.

Figure 12:
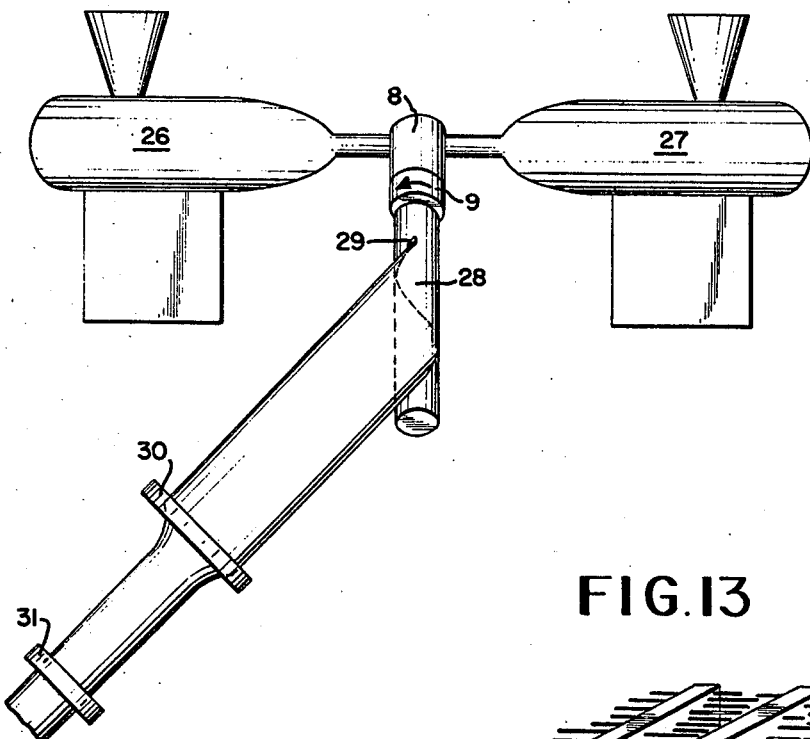

For a further illustration of the products of the invention and their manufacture, reference will be made to the accompanying drawings, in which FIG. 1 shows a cross-section of the thermoplastic sheet material in one embodiment, FIG. 2 a similar view of another embodiment, FIG. 3 a top plan view looking down on a longitudinal section or fragment of the sheet material of FIG. 1, showing the appearance in the longitudinal direction of the lamellae in this embodiment, the fragment being turned sidewise from its direction in FIG. 1 for convenience, FIG. 4, schematically, a longitudinal section of part of an extruding device for producing the sheet material of FIG. 2, FIG. 5, a corresponding cross-section, FIG. 6, schematically, part of an extruding device for producing the sheet material of FIGS. 1 and 3, FIG. 7 a corresponding cross-section, FIG. 8, schematically, a side view of the device of FIGS. 6 and 7, FIG. 9 a cross-section on a larger scale of details in the extruding device of FIGS. 6, 7 and 8, illustrating the formation of lamellae, FIG. 10 a cross-section of part of a stationary portion of a cylindrical extruder head for producing the present sheet material, FIG. 11 a cross-section of part of a movable portion of the extruder head of FIG. 9, FIG. 12 illustrates in a schematical view the use of two extruders with a common extruder head for producing the present sheet material in tubular form, cutting the tube helically to form a plane sheet material and stretching the latter longitudinally, FIG. 13 a greatly enlarged perspective view of two lamellae interconnected by fibres, and FIG. 14 a perspective view of a device for fiberizing the sheet material.

FIG. 15 is an integrated flow sheet showing in diagrammatic fashion the steps involved in carrying out the present invention, FIG. 16 is a photograph magnified 2.5 times of an actual product prepared in accordance with the invention, particularly in accordance with the embodiments disclosed in FIGS. 6 through 9 of the drawings.

Figure 3:
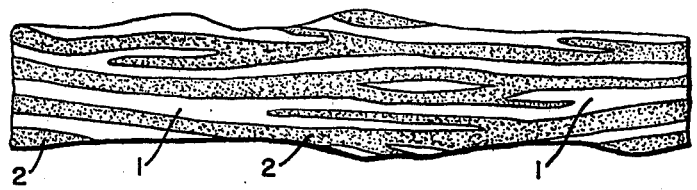

The sheet material of FIGS. 1 and 3 consists of lamellae 1 and 2 of thermoplastic polymers of differing properties. The sheet may be manufactured, for example, in thicknesses up to 2 mm. or more, and then cut parallel to the sheet plane into sheets of less thickness.

Figure 2:
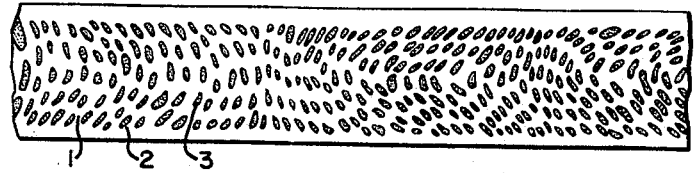

In the sheet material of FIG. 2, the lamellae 2 are divided longitudinally into a number of smaller lamellae 3.

The interfaces between the lamellae are usually curved, with tangents forming an angle up to 90° with the sheet plane. The thickness of the lamellae will normally be below one tenth of a millimeter and may advantageously be as small as a few microns.

As seen on FIG. 3 the borders between the lamellae form substantially parallel lines, but the lamellae need not be continuous in the longitudinal directions. On the contrary, a discontinuous structure as indicated in FIG. 3 is advantageous in several respects.

To produce the sheet material of FIG. 2, an extruding device may be used, the extrusion slit of which is illustrated by FIGS. 4 and 5. Said slit 4 is subdivided by a great number of parallelly mounted steel blades 5, extending from one side of the slit to the other. Each of the spaces 6 between said blades 5 is connected with a duct 7 in the extruder head, to which duct 7 a fluid mixture of two polymers of differing properties are supplied from an extruder (not shown). Said mixture consists of partially drawn out droplets of one polymer in the other, and on being pressed out of the extrusion slit, the blades 5 will create a laminar flow forming the fluid polymers into a lamellary structure as more specifically described later in connection with FIG. 9. After leaving the slit 4, cooling is applied to solidify the sheet.

A sheet of the structure illustrated by FIGS. 1 and 3 can be made, using an extruder head as illusrated by FIGS. 6 to 9. Said extruder head comprises a stationary part 8 and a movable part 9. The stationary part has an extrusion slit 10, being subdivided by steel blades 11 in similar manner as in FIGS. 4 and 5, but with the spaces alternatingly communicating with ducts 12 and 13, the polymers being supplied from separate extruders (not shown).

The slit 10 continues through the movable part 9, and is here subdivided by two sets of steel blades 14 and 15, the latter being positioned midway between and below the former.

The part 9 has wheels 16 running on rails 18 and may be moved forward and backward by means of an articulated rod 19 driven by an eccentric 20.

The mode of action of this device is illustrated in FIG. 9. Through the ducts 12 and 13, the polymers in a fluid state are pressed into the spaces between the steel blades 11 in the slit 10 of the stationary part 8 of the extruder head. On reciprocating the movable part 9, each of the blades 14 first slices off a layer of one polymer and then a layer of the other and so on. During the passage downward in the spaces between the blades 14, the friction with the surfaces of the blades will retard the material nearest to said surfaces, and the various layers will be more and more curved as shown. On meeting the edges of the blades 15, the streams will be parted in the middle, and the described procedure will be repeated during the passage through the spaces between the latter blades, as shown.

To regulate the friction, and to secure an even flow of the polymers, a lubricating agent, for example a corresponding monomer, may be supplied through a duct 21 in the stationary part 8 to the space between the latter and the movable part 9 to lubricate the surfaces of the part of the slit 10 positioned in the movable part 9. The thickness of said space between parts 8 and 9 may be regulated by means of screws 22 acting on part 8 to move it towards or from part 9.

As will be seen, the blades 15 stop a little short of the extrusion orifice in order to allow for some migration of the divided streams into one another to make for good cohesion in the extruded sheet 23 after solidification of the latter, as by cooling.

FIGS. 10 and 11 illustrate a cylindrical extruder head built after the principles of the device in FIGS. 6 to 9. FIG. 10 shows a cross-section of the stationary part 8 with slit 10 divided by radial blades 11, and annular ducts 12 and 13 communicating with alternate spaces between the blades 11.

FIG. 11 shows a cross-section of the movable part 9 with blades 14. In use, the part 9 is rotated, for example as suggested in the figure by a gear wheel 24 engaging a toothed rim 25 on part 9.

FIG. 12 illustrates how a tubular sheet material according to the invention may be manufactured by means of the cylindrical extruder head of FIGS. 10 and 11 and subsequently worked up. Extruders 26 and 27 supply polymers of different properties to the stationary part 8 of the circular extruder head. During the pasage through the rotating part 9, a tubular, lamellary sheet 28 is provided, which is helically cut up at 29, and drawn off by a pair of rollers 30. Another pair of rollers 31, operating at greater peripheral velocity may be used for stretching the lamelleary sheet to impart an orientation to one or both polymers. In the resulting sheet material, the longitudinal direction of the lamellae will form an angle with the longitudinal direction of the sheet.

Figure 13:
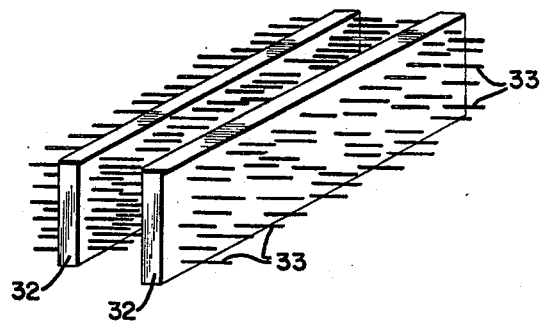

FIG. 13 illustrates how a fiberizing treatment may leave the lamellae 32 of one polymer intact, while the lamellae of the other polymer are split into fine fibres 33 interconnecting the lamellae 32.

Figure 14:
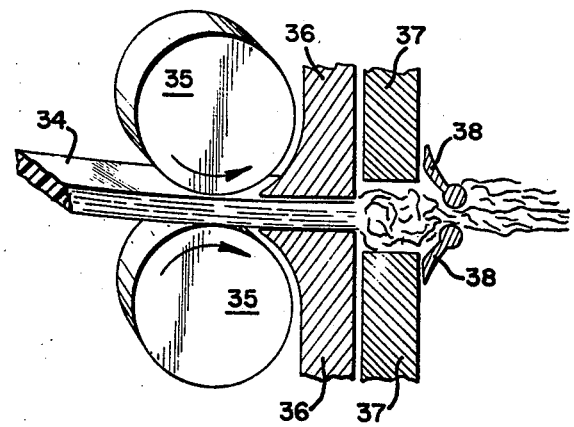

A device for subjecting the sheet material of the present invention to a fiberizing treatment is shown schematically in FIG. 14. The sheet material 34 is carried forward by rollers 35 between stationary jaws 36. Behind the jaws 36, another pair of jaws 37 perform a vibrating movement up and down, and if desired, also laterally, thus subjecting the sheet material to a series of sharp bends over the edges of the stationary jaws 36. A pair of spring-loaded jaws 38, hinged to the jaws 37, retards the passage through the latter and compresses the fiberized product.

The following examples further illustrate the principles of the invention.

In all examples, the melt index (M.I.) as determined according to ASTM D 1238-57T, for polyethylene and polyisobutylene under condition E, for polypropylene under a modified condition E, the modification consisting in the temperature being increased to 230° C., and for polyamides under condition K.

EXAMPLE 1

The two polymers used according to this example are polyethylene of a density of 0.96, and a M.I. of 0.2, i.e. a highly crystalline polyethylene of high molecular weight, and a polyethylene of a density of 0.92 and a M.I. of 20, i.e. a lowcrystalline and lowmolecular polyethylene, the latter making 20% by weight of the total amount of both polymers.

A coarse mixture is produced by mixing the two polymers in granular form, and passing this mixture through an extruder provided with an extruder head as shown in FIGS. 4 and 5 of the accompanying drawings. The resulting sheet in a thickness of 1 cm. is cut into thinner sheets of 0.5 mm. thickness by means of a ribbon-shaped knife.

The resulting sheets are highly fissile without any stretching to provide orienting of the polymers.

EXAMPLE 2

This example illustrates the production of a lamellary sheet material for fiberizing of one phase only, using low density polyethylene as the basic polymer in both phases, making one phase fragile by admixing a relatively low molecular polymer and the other phase tough by admixing an elastomer.

The tough phase is produced from a mixture of polyethylene of a density of 0.92 and a M.I. of 1, the latter making 30% by weight of the total mixture.

The fragile phase is produced from a mixture of polyethylene of a density of 0.92 and M.I. of 0.2 with polyethylene of density 0.92 and M.I. 20 in such proportions as to give the same viscosity at 250° C. as that of the mixture for the tough phase.

The two polymer mixtures are supplied from separate extruders to an extruder head as that shown in FIGS. 10 and 11 of the accompanying drawings, and extruded at a temperature of 250° C. to form a tubular sheet material of a thickness of 1 cm. The tube is cut helically to form a ribbon of the sheet material, which is then cut up parallel to the sheet plane to form films of 0.5 mm. thickness. These films will be found to consist of alternating lamellae of the two phases, said lamellae being of an average thickness of about 20μ and forming an angle to the film plane.

By stretching the films in the ratio 3:1, the lamellae of the fragile phase are easily split into fibres interconnecting the lamellae of the tough phase.

EXAMPLE 3

This example is in most respects similar to Example 2, the basic polymer of the two phases, however, being polypropylene instead of polyethylene.

The tough phase consists of polypropylene of M.I. 0.7 in a quality of substantially uniform molecular chain length.

The fragile phase consists of polypropylene of M.I. 0.1 to which is admixed polyethylene of density 0.92 and M.I. 20 in a ratio to give substantially the same viscosity at 300° C. as that of the tough phase.

The extrusion takes place at 300° C., and the procedure is as in Example 2.

The thickness of the lamellae is even here about 20μ, but the resulting films of 0.5 mm. thickness are highly fissile without stretching.

EXAMPLE 4

This example illustrates how fissility may be induced by irradiation, and how the phases may differ only with small amounts of additives.

The tough phase consists of a commercially available polypropylene of M.I. 0.7 containing antioxidants, to which carbon black is admixed in an amount of 2% by weight.

The fragile phase consists of the same kind of polypropylene, but without antioxidants and carbon black.

In the manner described in Example 2, a 1 cm. thick sheet material is produced, which is sliced into 0.2 mm. thick films. The average thickness of the lamellae is about 50μ.

On outdoor exposure for 3 months, the fragile phase is strongly decomposed, and thus made fissile. A fiberizing treatment results in the fragile phase splitting into fibres interconnecting the lamellae in the tough phase.

EXAMPLE 5

This example illustrates the use of solvents for making the sheet material of the invention fissile.

The solvent-resistant phase consists of polyethylene of density 0.96 and M.I. 1.0.

The solvent-susceptible phase consists of polyethylene of density 0.92 and M.I. 1.0.

The extrusion takes place at 250° C., and the resulting sheet of 1 cm. thickness is sliced to films of 0.5 mm. thickness. The latter are treated with xylene at a temperature of 85° C. for about 10 seconds, and then cooled. This treatment results in fissility of the surface layers of the solvent-susceptible phase of the films. On fiberizing, these parts will split, leaving the resistant lamellae intact. By repeating the procedure, the final result will be lamellae of the resistant phase interconnected with fibres of the susceptible phase.

EXAMPLE 6

This example is similar to Example 5, but with polyamides as the polymers.

The resistant phase consists of polycaprolactam of M.I. 8, and the susceptible phase of a copolymer of caprolactam and adipic acid+hexamethylene diamine of M.I. 8.

The temperature of the extruder head is kept at 280° C., and the resulting sheet material of 1 cm. thickness is sliced into films of 0.5 mm. thickness. The average thickness of the lamellae is 20μ.

The films are immersed for 24 hours in ethanol, resulting in a strong swelling of the copolymer. By subsequent immersion for 1 hour in water, the copolymer forms a fragile gel, and the films can now be subjected to a fiberizing treatment.

EXAMPLE 7

This example illustrates the use of curable polymers in the sheet material of the invention.

The polymer of the resistant phase is a polyester type precondensate or prepolymer which is produced by mixing 12 parts by weight of polypropylene glycol of equivalent weight 600 with 1 part by weight of toluene diisocyanate and, as an accelerator, 0.1 part by weight of stannooctoate. The mixture is kept for 24 hours at room temperature, after which no further condensation takes place.

The polymer of the fragile phase is prepared from the same glycol and isocyanate in the ratio of 12 parts to 3½ parts by weight by mixing and standing until the viscosity at room temperature is equal to that of the polymer of the resistant phase.

The extrusion takes place at room temperature, oleic acid being used as a lubricant, and the extrusion slit being reduced to 0.5 mm. thickness. The resulting sheet material is stretched to bring the thickness down to 0.1 mm., and is then heated to 50° C. for 15 minutes, while being supported on lubricated steel plates or bands. This heat treatment effects a curing of the resistant phase.

A subsequent treatment with steam at 100° C. effects an expansion of the fragile phase, resulting in the latter splitting into fibres immediately being cured by the steam.

EXAMPLE 8

This example illustrates the production of a lamellary sheet material with expansion of one of the phases.

For one phase is used polystyrene with a molecular weight of about 50,000 calculated as the total weight of all molecules divided by the total number of molecules.

For the other phase is used the same polystyrene having finely dispersed therein 5% by weight of water.

The lamellae of the latter phase will expand as the sheet material leaves the extruder head.

EXAMPLE 9

The sheet material of this example is excellently suited for the production of products for textile purposes of the structure shown on FIG. 13 of the accompanying drawings.

The polymers for the two phases are the same as in Example 2, as is also the extrusion temperature and the further procedure until films of 0.5 mm. thickness are obtained.

The said films are stretched at a temperature of 70° C. in the ratio of 4:1, the stretching being carried in such a direction that the direction of orientation resulting from the stretching forms an angle of about 5° with the main longitudinal direction of the lamellae.

The fragile phase lamellae are now easily split into fibres by a mechanical treatment. A subsequent lateral stretching at 70° C. effectively eliminates any tendency for further splitting.

EXAMPLE 10

A sheet material for similar use as that of Example 9 can also be produced using polypropylene as the basic polymer of the two phases.

The resistant phase consists of polylpropylene of M.I. 0.7 mixed with polyisobutylene of M.I. 1, the latter in an amount of 30% by weight of the mixture.

The fragile phase consists of a mixture of polypropylene of M.I. 0.1 and polyethylene of density 0.92 and M.I. 20 in proportions to give a viscosity at 300° C. equal to that of the polymer mixture of the resistant phase.

The temperature of the extruder head is kept at 300° C. during the extrusion, and the resulting sheet of 1 cm. thickness is sliced into films of 0.5 mm. thickness. The lamellae are of an average thickness of about 30μ.

The films are stretched obliquely at 120° C. in the ratio 6:1, the angle between the direction of orientation and the main longitudinal direction of the lamellae after stretching being about 3°.

After a splitting treatment to fiberize the lamellae of the fragile phase, the tendency for further splitting is eliminated by lateral stretching at 100° C.

EXAMPLE 11

In this example, polyamides take the place of the polyethylenes of Examples 9 and 10.

The resistant phase consists of polycaprolactam of M.I. 8, and the fragile phase consists of a mixture of polycaprolactam of M.I. 1 and a copolymer (nylon 6A) of caprolactam and adipic acid+hexamethylene diamine having a M.I. of 30.

The proportions of the components of the said mixture are adjusted so that the two phases have substantially the same viscosity at 280° C., at which temperature the extruder head is kept during the extrusion.

The resulting sheet material of 1 cm. thickness is sliced into films of 0.5 mm. thickness, the lamellae of which have an average thickness of about 20μ.

The films are stretched in such a manner at 160° C., and in the ratio 4:1, that the angle between the direction of orientation and the main longitudinal direction of the lamellae is about 5°.

The films are heated to 160° C. for two minutes, and are then immersed in ethanol to strongly swell the lamellae of the fragile phase. After swelling, the films are subjected to a fiberizing treatment, and the fibres are stabilized by lateral stretching at 120° C.

I claim:

1. An extruded synthetic sheet material at least partially in the form of an open network comprising at least one synthetic polymer substance in the form of a large multiplicity of thin lamellae of macroscopic size in at least their length and width, said lamellae being closely stacked with corresponding faces of adjacent lamellae having generally the same orientation at an angle to the surface of said sheet, said lamellae being generally separated from mutually facing lamellae by open air spaces over at least a portion of their faces.

2. A sheet material as in claim 1, in which said lamellae are in the form of segments stacked upon one another in parallel rows extending in the flat dimension of the sheet.

3. A sheet material as in claim 1, in which said lamellae traverse substantially the full thickness of the sheet from one surface thereof to the other.

4. A sheet material as in claim 1, in which said lamellae have an average thickness of about 50 μ or below.

5. A sheet material as in claim 1, in which said other polymer substance forms splitfibres interconnecting the said lamellae.

6. A sheet material as in claim 1, in which said other polymer substance is in an expanded state.

7. A sheet material as in claim 1, in which the lamellae forming substance is a polyamide.

8. The sheet material of claim 1 wherein said lamellae are of microscopic size in their thickness.

9. A sheet material as in claim 1, in which the lamellae forming substance is a polyalkylene.

10. The sheet material of claim 1, wherein the spaces separating adjacent lamellae of said polymeric substance are partially occupied by another extrudable substance.

11. The sheet material of claim 9 wherein said other extrudable substance comprises partial interconnections between adjacent lamellae.

12. The sheet material of claim 10 wherein said partial interconnections are generally fibrous in form.

13. A process for producing a sheet material comprising the steps of extruding at least two thermoplastic materials, at least one of which is a syntheic polymer, in the form of a multitude of fluid streams arranged side by side substantially in a row in spaced generally parallel relation so as to be adapted to form a sheet when merged together to eliminate the spaces therebetween, each of said streams having at least two of said materials distributed therein in the form of interspersed lamellae of macroscopic size in at least the length and width having their width extending at an angle to the surface of the ultimately formed sheet, merging the streams in said row sidewise to unite them to form a sheet, and solidifying said sheet thus obtained.

14. A process as in claim 13, in which said streams are formed by mixing the two materials coarsely and extruding the coarse mixture in fluid state through an extrusion slot, which is subdivided into a multiplicity of smaller sections.

15. The process of claim 13 wherein at least one of said two thermoplastic materials is a prepolymer.

16. A process as in claim 13, in which said streams are formed by first extruding interspersed streams of at least two different materials and then cutting each of said streams into segments and forming segments of streams of different materials in succession into new streams.

17. A process for producing a synthetic fibrous material comprising the steps of extruding in the form of a sheet a synthetic polymer substance and at least one other exrudable substance with said polymer substance in the form of a large multiplicity of thin lamellae of macroscopic size in at least the length and width, said lamellae being arranged in closely stacked spaced relation with corresponding faces of adjacent lamellae having generally the same orientation at an angle to the surface of the sheet, said other substance occupying the spaces between said lamellae, and a least partially disrupting the connections between the correspoding faces of said lamellae of said polymer substance to form an interconnected fibrous structure in which some of the mutually facing lamellae of said polymer substance are separated by air gaps between their faces.

18. An extrusion apparatus for extruding a composite sheet of a plurality of extrudable materials, said apparatus comprising a multiplicity of generally elongated extrusion slots arranged side-by-side in a row into generally parallel relation, the total width of said row being substantially greater than the corresponding dimension of a single slot, a common manifold connecting to each of said slots to supply the same with a dispersed mixture of said plurality of extrudable materials, and a common collection slot extending substantially the length of said row of slots proximate to their egress openings for receiving the material from said slots and forming the same into a composite unitary sheet emerging from said collection slot, said sheet having thin layers of said extrudable material stacked together and extending at an angle to the sheet surface at least partially through the sheet thickness.

19. The apparatus of claim 18 wherein said row of slots is linear and said array of passages is reciprocated relative to said slot row.

20. The apparatus of claim 18 wherein said row of slots is circular and said array of passages is rotated in one direction relative thereto.

21. An extrusion apparatus for extruding a composite sheet of a plurality of extrudable materials, which apparatus comprises a multiplicity of extrusion slots arranged side by side in a row in generally parallel relation, a plurality of separate manifolds, each connected to a group of said slots interspersed with the slots connected to the other manifolds to supply such group with one of said extrudable materials; an array of extrusion passages arranged side by side in a row in generally parallel relation, said row of passages being generally aligned with the row of extrusion slots and having the ingress ends thereof communicating with the egress openings of said slots, whereby the materials extruded by said slots enters said passages; means for effecting relative movement of said row of slots and said array of passages bodily perpendicularly of the extrusion direction; and a common collection chamber extending substantially the length of said passage array in communication with the egress ends of said passages to receive the material emerging therefrom and form the same into a composite unitary sheet comprised of thin layers of the extrudable materials stacked together and extending width-wise at an angle to the sheet surface at least partially through the sheet thickness.

References Cited

UNITED STATES PATENTS

| | | | |
|---|---|---|---|
| 2,371,349 | 3/1945 | Norton | 264—75 |
| 2,573,050 | 10/1951 | Orsini | 264—75 XR |
| 2,815,033 | 12/1957 | Braunlich | 264—75 XR |
| 3,013,309 | 12/1961 | Maier et al. | 264—176 XR |

OTHER REFERENCES

Ingram et al., Electron Defraction and Microspy . . ., Polymer, vol. 7, no. 3 (March 1966), Butterworths, London, pp. 135–137, 140–142, 144–148 relied on.

Schmidt and Marlies, Principles of High Polymer Theory and Practice, McGraw-Hill, New York, (1948) pp. 102, 139, 147, and 236 relied on.

JOHN T. GOOLKASIAN, Primary Examiner

W. E. HOAG, Assistant Examiner

U.S. Cl. X.R.

18—13; 161—227, 247; 260—25, 857, 858, 860, 897; 264—75, 171, 174, 176

UNITED STATES PATENT OFFICE
CERTIFICATE OF CORRECTION

Patent No. 3,511,742           Dated May 12, 1970

Inventor(s) Ole-Bendt Rasmussen

It is certified that error appears in the above-identified patent and that said Letters Patent are hereby corrected as shown below:

Column 12, line 40, change "9" to --10--.
          line 43, change "10" to --11--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents